US011978423B2

(12) United States Patent
Roberts

(10) Patent No.: US 11,978,423 B2
(45) Date of Patent: *May 7, 2024

(54) METHODS, SYSTEMS, AND MEDIA FOR MANAGING OUTPUT OF AN HDMI SOURCE

(71) Applicant: Google LLC, Mountain View, CA (US)

(72) Inventor: Eric Jason Roberts, Chandler, AZ (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/958,825

(22) Filed: Oct. 3, 2022

(65) Prior Publication Data

US 2023/0027046 A1 Jan. 26, 2023

Related U.S. Application Data

(63) Continuation of application No. 17/092,958, filed on Nov. 9, 2020, now Pat. No. 11,462,191, which is a (Continued)

(51) Int. Cl.
*G09G 5/00* (2006.01)
*G06F 13/40* (2006.01)
(Continued)

(52) U.S. Cl.
CPC ......... *G09G 5/006* (2013.01); *G06F 13/4022* (2013.01); *G06F 13/4282* (2013.01);
(Continued)

(58) Field of Classification Search
CPC ...... G09G 5/006; G09G 5/12; G06F 13/4022; G06F 13/4282; H04N 5/268;
(Continued)

(56) References Cited

U.S. PATENT DOCUMENTS 8,286,210 B2  10/2012  Boyden et al.
8,587,723 B2  11/2013  Nakajima et al.
(Continued)

FOREIGN PATENT DOCUMENTS

EP  2395751  12/2011
JP  2011055142  3/2011
(Continued)

OTHER PUBLICATIONS

Decision to Refuse a European Patent Application dated Jan. 25, 2019 in EP Patent Application No. 14736227.1.
(Continued)

*Primary Examiner* — Tammara R Peyton
(74) *Attorney, Agent, or Firm* — Brake Hughes Bellermann LLP

(57) ABSTRACT

Mechanisms for managing output of an HDMI source are provided. In accordance with some implementations of the disclosed subject matter, a method for controlling output of an HDMI source is provided, the method comprising: establishing a connection between the HDMI source and an HDMI sink at a first address of a consumer electronic control bus of the HDMI sink; sending a request for an identity of the active source connected to the HDMI sink; monitoring signals on the consumer electronic control bus; receiving a message over the consumer electronic control bus identifying a second address on the consumer electronic control bus different from the first address as an address of an active source; setting a status of the HDMI source as inactive in response to receiving the message; and inhibiting output of video from the HDMI source to the HDMI sink in response to the status being set as inactive.

20 Claims, 9 Drawing Sheets

Related U.S. Application Data continuation of application No. 16/384,309, filed on Apr. 15, 2019, now Pat. No. 10,832,634, which is a continuation of application No. 16/029,122, filed on Jul. 6, 2018, now Pat. No. 10,262,627, which is a continuation of application No. 15/274,906, filed on Sep. 23, 2016, now Pat. No. 10,032,433, which is a continuation of application No. 14/303,255, filed on Jun. 12, 2014, now Pat. No. 9,456,149.

(60) Provisional application No. 61/834,519, filed on Jun. 13, 2013.

(51) Int. Cl.
| | |
|---|---|
| *G06F 13/42* | (2006.01) |
| *G09G 5/12* | (2006.01) |
| *H04N 5/268* | (2006.01) |
| *H04N 21/436* | (2011.01) |
| *H04N 21/4363* | (2011.01) |
| *H04N 21/442* | (2011.01) |
| *H04N 21/63* | (2011.01) |

(52) U.S. Cl.
CPC ............... *G09G 5/12* (2013.01); *H04N 5/268* (2013.01); *H04N 21/43615* (2013.01); *H04N 21/43635* (2013.01); *H04N 21/44231* (2013.01); *H04N 21/63* (2013.01); *G09G 2370/04* (2013.01); *G09G 2370/06* (2013.01); *G09G 2370/12* (2013.01)

(58) Field of Classification Search
CPC ....... H04N 21/43615; H04N 21/43635; H04N 21/44231; H04N 21/63
See application file for complete search history.

(56) References Cited

U.S. PATENT DOCUMENTS

| | | | |
|---|---|---|---|
| 8,745,305 | B2 | 6/2014 | Toba et al. |
| 9,113,123 | B2 | 8/2015 | Koizumi |
| 9,167,282 | B2 | 10/2015 | Tran et al. |
| 9,232,265 | B2 | 1/2016 | Maxwell et al. |
| 9,456,149 | B2 | 9/2016 | Roberts |
| 10,032,433 | B2 | 7/2018 | Roberts |
| 10,262,627 | B2 | 4/2019 | Roberts |
| 2009/0177818 | A1 | 7/2009 | Shim et al. |
| 2009/0207308 | A1 | 8/2009 | Shoji |
| 2012/0136612 | A1 | 5/2012 | Vanderhoff et al. |
| 2012/0274857 | A1 | 11/2012 | Maxwell et al. |
| 2013/0159751 | A1 | 6/2013 | Theoduloz et al. |
| 2013/0229579 | A1 | 9/2013 | Jiang |

FOREIGN PATENT DOCUMENTS

| | | |
|---|---|---|
| JP | 2012124866 | 6/2012 |
| WO | WO 2009079754 | 7/2009 |
| WO | WO 2012135626 | 10/2012 |

OTHER PUBLICATIONS

Examination Report dated Mar. 23, 2017 in EP Patent Application No. 14736227.1.
HDMI Licensing, "Supplement 1: Consumer Electronics Control", Technical Paper, version 1.3a, Mar. 17, 2013, pp. 1-104.
International Search Report and Written Opinion dated Nov. 26, 2014 in International Patent Application No. PCT/US2014/042147.
Notice of Allowance dated Mar. 26, 2018 in U.S. Appl. No. 15/274,906.
Notice of Allowance dated May 26, 2016 in U.S. Appl. No. 14/303,255.
Notice of Allowance dated May 31, 2022 in U.S. Appl. No. 17/092,958.
Notice of Allowance dated Jul. 1, 2020 in U.S. Appl. No. 16/384,309.
Notice of Allowance dated Dec. 5, 2018 in U.S. Appl. No. 16/029,122.
Notice of Grant dated Jan. 17, 2018 in CN Patent Application No. 201480033793.5.
Office Action dated Jan. 10, 2018 in KR Patent Application No. 10-2015-7037274.
Office Action dated Feb. 3, 2022 in U.S. Appl. No. 17/092,958.
Office Action dated Apr. 3, 2020 in U.S. Appl. No. 16/384,309.
Office Action dated Apr. 21, 2017 in CN Application No. 201480033793.5.
Office Action dated Aug. 10, 2018 in U.S. Appl. No. 16/029,122.
Office Action dated Sep. 17, 2015 in U.S. Appl. No. 14/303,255.
Office Action dated Sep. 19, 2019 in U.S. Appl. No. 16/384,309.
Office Action dated Dec. 14, 2017 in U.S. Appl. No. 15/274,906.
Summons to Attend Oral Proceedings dated May 24, 2018 in EP Patent Application No. 14736227.1.

| Address | Device |
|---|---|
| 0 | TV |
| 1 | Recording Device 1 |
| 2 | Recording Device 2 |
| 3 | Tuner 1 |
| 4 | Playback Device 1 |
| 5 | Audio System |
| 6 | Tuner 2 |
| 7 | Tuner 3 |
| 8 | Playback Device 2 |
| 9 | Playback Device 3 |
| 10 | Tuner 4 |
| 11 | Playback Device 3 |
| 12 | Reserved |
| 13 | Reserved |
| 14 | Free Use |
| 15 | Unregistered (as initiator address) Broadcast (as destination address) |

300

RELATED ART

FIG. 3

METHODS, SYSTEMS, AND MEDIA FOR MANAGING OUTPUT OF AN HDMI SOURCE

CROSS-REFERENCE TO RELATED APPLICATIONS

This application is a continuation of U.S. patent application Ser. No. 17/092,958, filed Nov. 9, 2020, which is a continuation of U.S. patent application Ser. No. 16/384,309, filed Apr. 15, 2019, which is a continuation of U.S. patent application Ser. No. 16/029,122, filed Jul. 6, 2018, which is a continuation of U.S. patent application Ser. No. 15/274,906, filed Sep. 23, 2016, which is a continuation of U.S. patent application Ser. No. 14/303,255, filed Jun. 12, 2014, which claims the benefit of U.S. Provisional Patent Application No. 61/834,519, filed Jun. 13, 2013, each of which is hereby incorporated by reference herein in its entirety.

TECHNICAL FIELD

The disclosed subject matter relates to methods, systems, and media for managing output of an HDMI source.

BACKGROUND

In general, a High-Definition Multimedia Interface (HDMI) source 102 (e.g., a source of audio and/or video data such as a set-top box, a digital media receiver, an optical media player, etc.) uses a unidirectional interface to transmit audio and/or video data to an HDMI sink 104 so that the audio and/or video data can be presented. FIG. 1 shows an example of an interconnection between HDMI source 102 and HDMI sink 104, where audio and/or video data is transmitted over TMDS channels 106 from an HDMI transmitter 108 of HDMI source 102 to an HDMI receiver 110 of HDMI sink 104. In such an implementation, there is no feedback to HDMI source 102 as to whether the audio and/or video data being transmitted to HDMI sink 104 is being presented by a display, speakers, etc., of HDMI sink 104. A signal or signals can be sent from HDMI sink 104 to HDMI source 102 over a hot plug detect (HPD) line 112, which can indicate to HDMI source 102 that an HDMI connection has been established between HDMI source 102 and HDMI sink 104. However, information related to whether HDMI source 102 is connected to HDMI sink 104 may not indicate whether or not HDMI sink 102 is in an "on" state, whether the output from HDMI source 102 is being presented by HDMI sink 104, or whether an HDMI input to which HDMI source 102 is connected is selected or active.

Certain HDMI sources can use a Consumer Electronic Control (CEC) line 114 to communicate with an HDMI sink and/or one or more other HDMI sources connected in a network via a CEC bus. Messages sent on the CEC bus using the CEC line 114 can be addressed to a particular physical and/or logical address of an HDMI device connected to the CEC bus (e.g., as described below). Particular types of messages that comply with the HDMI CEC standard can be sent over the CEC bus to a particular address (e.g., a physical address and/or a logical address) or as a broadcast message to all HDMI devices connected to the CEC bus.

However, the HDMI standard does not include a signal, on the CEC bus or through another communication channel, that allows HDMI source 102 to determine directly whether audio and/or video being output by HDMI source 104 is being presented to a user (e.g., using a television, an audio amplifier, speakers, etc.).

Accordingly, it is desirable to provide methods, systems and media for managing output of an HDMI source.

SUMMARY

In accordance with various implementations of the disclosed subject matter, methods, systems, and media for managing output of an HDMI source are provided.

In accordance with some implementations of the disclosed subject matter, methods for controlling output of an HDMI source are provided, the methods comprising: establishing a connection between the HDMI source and an HDMI sink at a first address of a consumer electronic control bus of the HDMI sink; sending a request for an identity of the active source connected to the HDMI sink; monitoring signals on the consumer electronic control bus; receiving a message over the consumer electronic control bus identifying a second address on the consumer electronic control bus different from the first address as an address of an active source; setting a status of the HDMI source as inactive in response to receiving the message; and inhibiting output of video from the HDMI source to the HDMI sink in response to the status being set as inactive.

In accordance with some implementations of the disclosed subject matter, systems for controlling output of an HDMI source are provided, the systems comprising: a hardware processor that is programmed to: establish a connection between the HDMI source and an HDMI sink at a first address of a consumer electronic control bus of the HDMI sink; send a request for an identity of the active source connected to the HDMI sink; monitor signals on the consumer electronic control bus; receive a message over the consumer electronic control bus identifying a second address on the consumer electronic control bus different from the first address as an address of an active source; set a status of the HDMI source as inactive in response to receiving the message; and inhibit output of video from the HDMI source to the HDMI sink in response to the status being set as inactive.

In accordance with some implementations of the disclosed subject matter, non-transitory computer-readable media containing computer executable instructions that, when executed by a processor, cause the processor to perform methods for controlling output of an HDMI source are provided, the methods comprising: establishing a connection between the HDMI source and an HDMI sink at a first address of a consumer electronic control bus of the HDMI sink; sending a request for an identity of the active source connected to the HDMI sink; monitoring signals on the consumer electronic control bus; receiving a message over the consumer electronic control bus identifying a second address on the consumer electronic control bus different from the first address as an address of an active source; setting a status of the HDMI source as inactive in response to receiving the message; and inhibiting output of video from the HDMI source to the HDMI sink in response to the status being set as inactive.

In accordance with some implementations of the disclosed subject matter, systems for controlling output of an HDMI source are provided, the systems comprising: means for establishing a connection between the HDMI source and an HDMI sink at a first address of a consumer electronic control bus of the HDMI sink; means for sending a request for an identity of the active source connected to the HDMI sink; means for monitoring signals on the consumer electronic control bus; means for receiving a message over the consumer electronic control bus identifying a second address on the consumer electronic control bus different from the first address as an address of an active source; means for setting a status of the HDMI source as inactive in response to receiving the message; and means for inhibiting output of video from the HDMI source to the HDMI sink in response to the status being set as inactive.

In some implementation, the message received over the consumer electronic control bus is received in response to the request for an identity of the active source and identifies a second HDMI source as the active source.

In some implementation, the message identifies the second address on the consumer electronic bus as an address to be set as the active source.

In some implementation, the systems further comprise means for inhibiting receipt of content by the HDMI source from a remote content source in response to the status being set as inactive.

In some implementation, the systems further comprise means for determining a proportion of time that the HDMI source is used as an active source relative to other sources connected to the consumer electronic control bus based the status of the HDMI source.

In some implementation, the systems further comprise: means for determining that the HDMI sink is in a standby mode; and (a) means for sending a request for a power status of the HDMI sink in response to determining that the HDMI sink is in the standby mode; (b) means for receiving a power status of the HDMI sink; (c) means for determining that the power status of the HDMI sink from the received power status; (d) means for re-utilizing the means of (a)-(c) in response to determining that the HDMI sink is in a standby state; (e) means for determining an active status of the HDMI source upon determining that the HDMI sink is in an on state utilizing the means of (c); and (f) means for setting the status of the HDMI source based on the determination by the means of (e).

In some implementation, the systems further comprise: means for determining that the HDMI source was an active device at a time at which it is determined that the HDMI sink is in the standby mode; wherein the means of (f) further comprises means for setting the status of the HDMI source to active; and means for causing video to be output by the HDMI source in response to the status being set to active.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 3 shows an example of logical addresses that can be assigned to various HDMI devices in accordance with some implementations of the disclosed subject matter.

DETAILED DESCRIPTION

Figure 1:
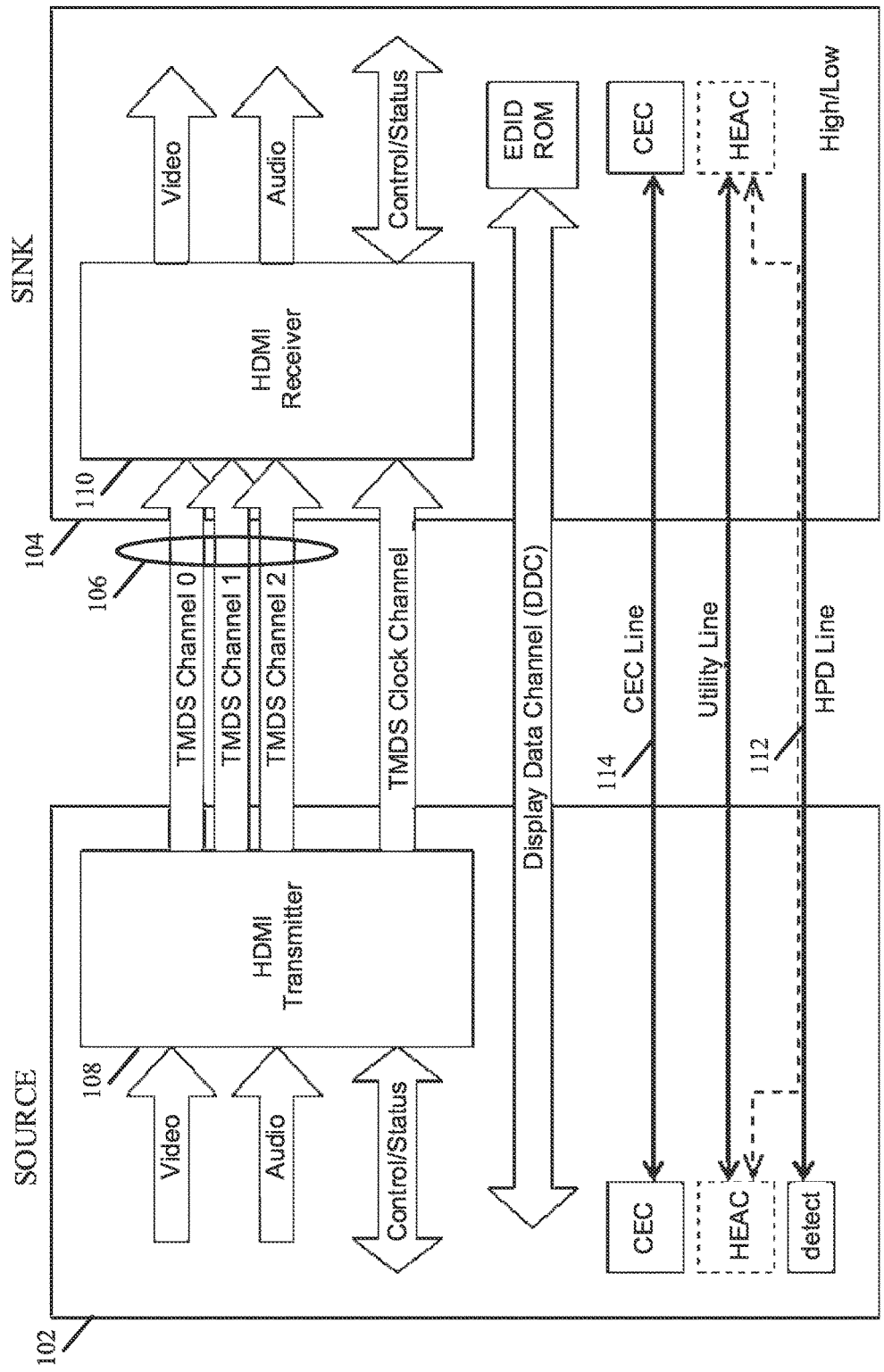
FIG. 1 shows an example of interconnections between an HDMI source and an HDMI sink in accordance with related art.

In accordance with various implementations, mechanisms for managing an output of an HDMI source are provided.

In some implementations, methods, systems, and media are described herein that can be used to determine when an HDMI source is connected to an HDMI sink, whether the HDMI source is the active source (e.g., whether audio and/or video data output by the device is being presented), an inactive source (e.g., whether audio and/or video data output by the device is not being presented), or that the status of the source cannot be determined (e.g., it is unknown whether audio and/or video data output by the device is being presented). Additionally, whether the HDMI source is in an "active" state (e.g., is the active source) or in an "inactive" state (e.g., is not the active source) can be tracked to determine an amount of time that the audio and/or video data is being presented from the HDMI source compared to how much time the system (e.g., the HDMI sink) is in an "on" state (e.g., rather than a "standby" state or a completely off state, such as when the system is disconnected from a source of electrical power).

In some implementations, upon an HDMI source being connected to an HDMI sink, the HDMI source can execute an initialization sequence to determine whether the HDMI source is the active device of the system. Such an initialization sequence can include any suitable actions such as, requesting an identity of the active source, determining whether the system is in an "on" state, etc.

In some implementations, the HDMI source using the mechanisms described herein can check to determine whether the HDMI source is the active source or whether the HDMI source is an inactive source. Any suitable technique or combination of techniques can be used to determine whether the HDMI source is the active source. For example, the HDMI source can monitor the CEC bus to determine if a message is received indicating that the HDMI source is to be set as the active source. As another example, the HDMI source can determine whether a command has been received (e.g., from a remote control of the HDMI source, a button of the HDMI source, etc.) to play content of the HDMI source (e.g., a "One Touch Play" command). Similarly, any suitable technique(s) can be used to determine whether the HDMI source is an inactive source. For example, the HDMI source can monitor signals on the CEC bus to determine: if another device declares that it is the active source; if that other device is identified in a CEC message as a device to be set as the active device; if the HDMI source is disconnected from the sink; etc.

In some implementations, output of audio and/or video data by the HDMI source can be controlled based on whether the HDMI source is determined to be the active device, or an inactive device. For example, if the HDMI source is determined to be an inactive device, audio and/or video data output by the HDMI source can be inhibited. As another example, if the HDMI source is determined to be an inactive device, the HDMI source device can enter a low-power and/or standby state. As yet another example, if the HDMI source is determined to be an inactive device, the HDMI source device can pause or inhibit services that may be consuming network resources, such as bandwidth.

Figure 2:
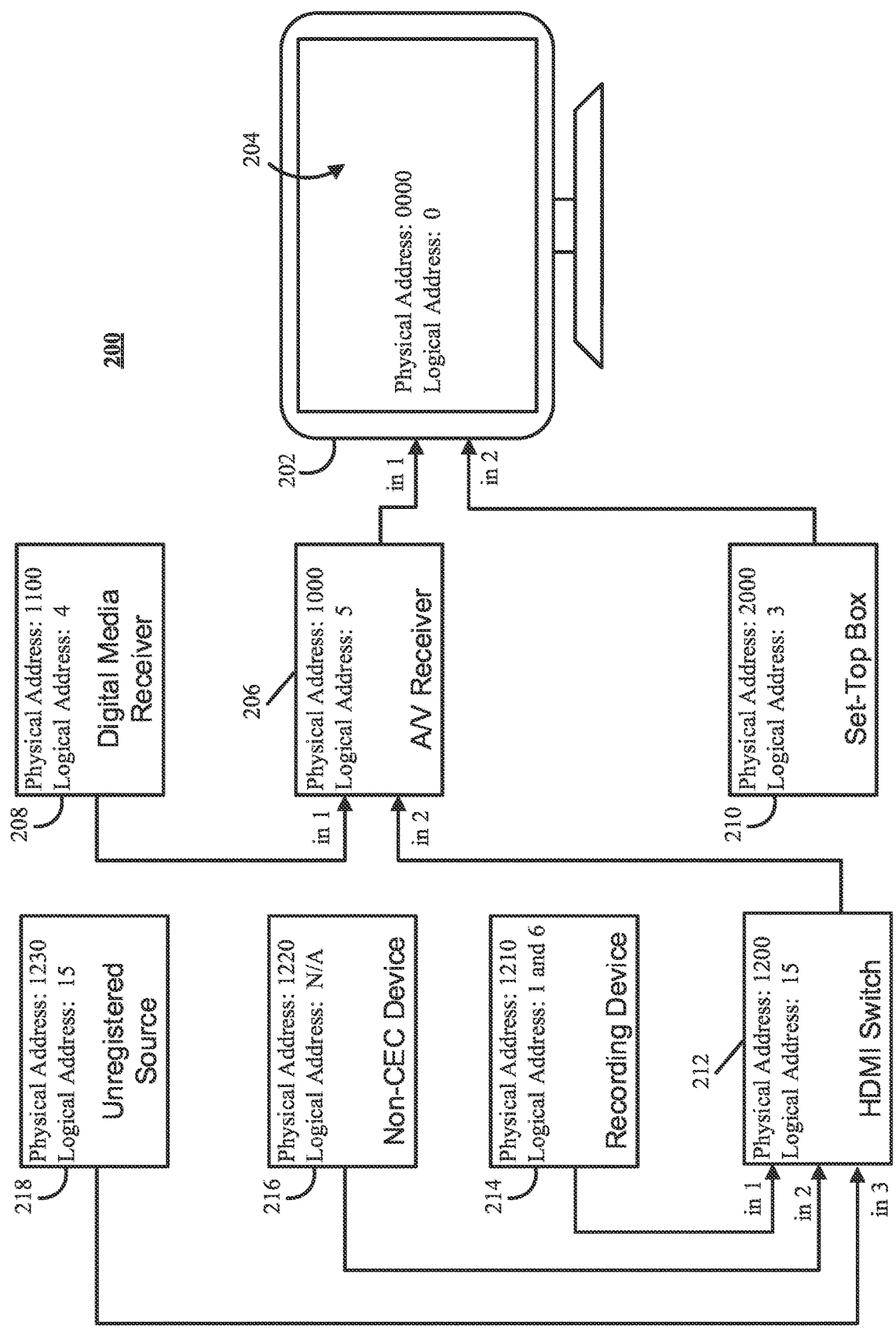
FIG. 2 shows an example of a system for managing output of an HDMI source in accordance with some implementations of the disclosed subject matter.

Turning to FIG. 2, an example 200 of a system for managing output of an HDMI source is shown in accordance with some implementations of the disclosed subject matter. In some implementations, system 200 can include multiple HDMI devices 206-218 connected to a root device 202 using HDMI communication links. These multiple HDMI devices can be interconnected by a CEC bus that allows two-way communication of messages between connected CEC-enabled HDMI devices.

In some implementations, each HDMI device included in system 200 and connected to the CEC bus can be assigned both a physical address and/or a logical address. In some implementations, the physical address can be defined by a path from the root device 202 to any particular HDMI device of the system. Additionally, the physical address can be defined hierarchically, such that the physical address of a particular HDMI device identifies all interconnections between root device 202 and that particular HDMI device. For example, root device 202 can take physical address 0.0.0.0, which can define the device as the root device of the HDMI network. As another example, a first HDMI device connected to a first HDMI connector of root device 202 (e.g., HDMI device 206) can take physical address 1.0.0.0, indicating that such device is connected directly to the first HDMI connector of root device 202. Similarly, a second HDMI device connected to a second HDMI connector of root device 202 can take physical address 2.0.0.0, indicating that such device is connected directly to the second HDMI connector of root device 202. As yet another example, a third HDMI device (e.g., HDMI device 208) connected to root device 202 via an intermediate HDMI device (e.g., HDMI device 206), can take a physical address 1.1.0.0, which can indicate that the device is connected to root device 202 through HDMI device 206.

In some implementations, an HDMI device included in system 200 can be assigned a logical address in addition to a physical address. Such logical address can sometimes act as a unique identifier for the HDMI device (depending on the logical address, as described below), and can identify functions that the HDMI device can perform. Additionally, multiple logical addresses can correspond to a single HDMI device in system 200, if such a device is configured to perform multiple functions and/or receive instructions to perform multiple functions. FIG. 3 shows an example 300 of logical addresses that can be assigned to various HDMI devices based on the function(s) of the HDMI device. In some implementations, a logical address can be assigned when an HDMI device is connected to system 200, when the HDMI device transitions from a "standby" state to an "on" state, etc.

In some implementations, each HDMI device that is in an "on" state and connected to root device 202 can be assigned a unique logical address (or addresses) if possible. As described above, a logical address assigned to an HDMI device can be based on functions that the device can carry out. For example, root device 202 can be a digital television, and can take logical address 0 indicating that digital television 202 is a television, having an output 204 which can include, e.g., a display, amplifiers, speakers, a projector, etc. As another example, HDMI device 206 can be an audio-video receiver (AVR), and can take logical address 5 indicating that AVR 206 is an audio system. As yet another example, HDMI device 208 can be a digital media receiver (e.g., a computing device for presenting audio and/or video information from various sources, such as: a remote content server; a network attached storage; a second computing device connected over a local or non-local data network, etc.), and can take logical address 4 indicating that digital media receiver 208 is a playback device (note that digital media receiver 208 is sometimes referred to herein as DMR 208 or receiver 208). As still another example, HDMI device 210 can be a set-top box, and can take logical address 3 indicating that set-top box 210 has a tuner.

In some implementations, system 200 can include various HDMI devices, such as an HDMI switch 212, which can have physical address 1.2.0.0 (e.g., indicating that HDMI switch 212 is connected to the second input of a device connected to the first input of television 202, having physical address 0.0.0.0), and logical address 15 (e.g., indicating that HDMI switch 212 is acting as a switch without other functions, and thus is an unregistered device). Note that, in some implementations, each logical address may only be assigned to a single physical address, except that logical address 15 can be assigned to multiple physical addresses. In some implementations, system 200 can include any other suitable device or devices. For example, a recording device 214 can be included in system 200. Recording device 214 can have a tuner and a recording capability, and therefore can take logical addresses 1 and 6 if recording device 214 exposes both functions of the device to system 200. Recording device can also can have physical address 1.2.1.0 (e.g., indicating a position of recording device 214 within the network of system 200). As another example, a non-CEC enabled HDMI device 216, such as a game console that does not comply with the CEC standard can be included in system 200. Non-CEC enabled HDMI device 216 can have physical address 1.2.2.0 (e.g., indicating a position of non-CEC enabled HDMI device 216 within the network of system 200), but may not be assigned a logical address because the device does not comply with the CEC standard. As yet another example, an unidentified HDMI source 218 can be included in system 200. Unidentified HDMI source 218 can have physical address 1.2.1.0 and logical address 15 (e.g., indicating that HDMI source 218 is unregistered as a particular type of HDMI device).

In some implementations, various messages can be sent over the CEC bus to control actions of CEC enabled devices connected to system 202. For example, a tuner of a first device connected to the CEC bus can be controlled based on messages received at the first device from a second device connected to the CEC bus. As another example, a volume level of a first device connected to the CEC bus can be controlled based on messages received at the first device from a second device connected to the CEC bus. As yet another example, a power state (e.g., whether the device is in an "on" or "standby" state) of a first device connected to the CEC bus can be controlled based on messages received at the first device from a second device connected to the CEC bus. As still another example, a first device connected to the CEC bus can declare itself as the active device on the CEC bus and can cause the root device (and/or other devices) to present content (e.g., audio and/or video content) supplied by the first device. As a further example, a first device connected to the CEC bus can send a message indicating that a particular device on the bus is to be set as the active source, which may or may not be a CEC enabled device (e.g., a message can be sent indicating that a non-CEC enabled device has been set as the source).

In some implementations, any suitable types of messages that comply with the CEC standard can be sent and/or received over the CEC bus. For example, routing control messages can be sent and/or received over the CEC bus. Such routing control messages can request an identity of an active source, can be sent with an identity of an active source (e.g., in response to a message requesting an identity of the active source), can identify a source to be set as the active source, can identify a source that has been set as the active source (e.g., regardless of whether the source is a CEC enabled HDMI device), etc.

In some implementations, a CEC enabled HDMI device can declare to other devices on the CEC bus that it is the active source by sending an<Active Source>message on the CEC bus. Such a message can include a physical address and/or logical address of the device sending the message, which can be used by other devices to determine which source is declaring itself to be the active source. For example, if the device declaring itself to be the active source is connected to an HDMI sink through an HDMI switch, the HDMI switch can use the address information to determine a correct input of the HDMI switch to select so that information can be correctly routed from the device that declared itself to be the active source to the HDMI sink.

In some implementations, a CEC enabled HDMI device can request an identity of an active device on the CEC bus by sending a<Request Active Source>message on the CEC bus. If such a message is received by a CEC enabled HDMI device that is the active source (or identifies as the active source), such an active source can be required to transmit an<Active Source>message on the CEC bus in response to receiving the <Request Active Source>message. Additionally, in some implementations, if an HDMI device is switched to an analog input (or any other non-HDMI input), and audio and/or video data from the analog input is being output by the television, the HDMI device can identify itself as the active source. For example, a root device can identify itself as the active source when switching to an internal receiver or to a non-HDMI input of the root device (e.g., an RCA input, a component input, etc.). As another example, an AN receiver or other HDMI device can identify itself as the active source when an input of such a device is switched to a non-HDMI source.

In some implementations, a CEC enabled HDMI root device (or any other suitable CEC enabled HDMI device) can select an HDMI device connected to the root device as an active source by sending a<Set Stream Path>message on the CEC bus. Such a message can contain the physical address of a device to be selected (which can be a CEC enabled or non-CEC enable device). In some implementations, the device having the physical address in the message can send an<Active Device>message in response to the <Set Stream Path>message, if the device is a CEC enabled device.

In some implementations, a CEC enabled HDMI switching device can send a <Routing Change>message on the CEC bus. Such a message can include a physical address indicated by the newly selected input, and can indicate that the active input has changed. In cases where an HDMI switching device receives a<Routing Change>message (e.g., either a standalone switching device, such as HDMI switch 212, or a device that includes an HDMI switch, such as A/V receiver 206), the switch can send a<Routing Information>message on the CEC bus that includes a currently active input/path from of the switch that was addressed by the <Routing Change>message. For example, if a user causes the input of television 202 from "in 2" where set-top box 210 was the active device, to "in 1," television 202 can send a<Routing Change>message on the CEC bus, and A/V receiver 206 can respond by sending a<Routing Information>message on the CEC bus indicating a currently active path of A/V receiver 206 (e.g., whether "in 1" or "in 2" of A/V receiver 206 is active).

Figure 4A:
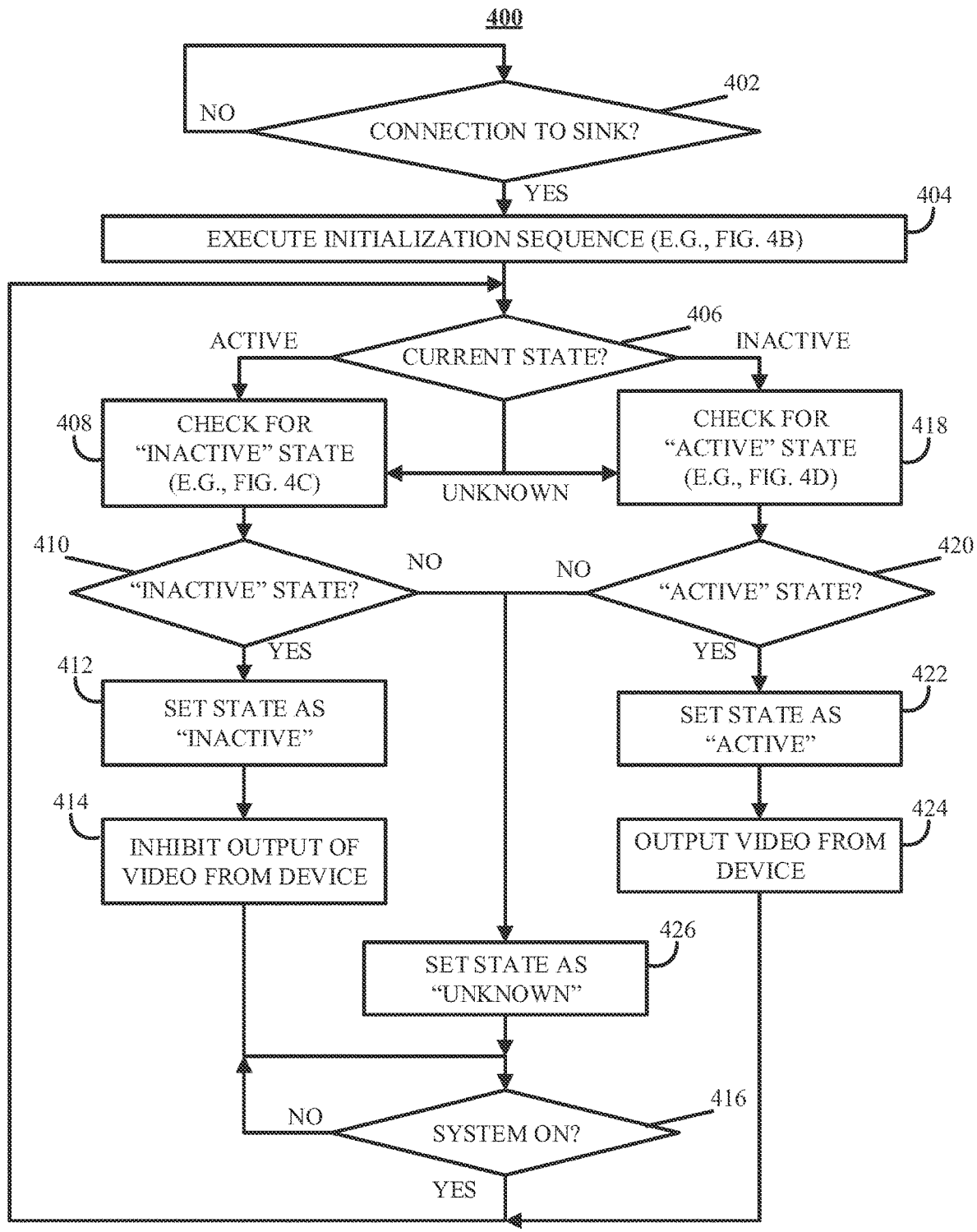
FIG. 4A shows an example of a process for managing the output of an HDMI source based on an active signal of the HDMI source in accordance with some implementations of the disclosed subject matter.

Turning to FIG. 4A, an example 400 of a process for managing the output of an HDMI source based on an active signal of the HDMI source is shown in accordance with some implementations of the disclosed subject matter. Such a process can be used to determine whether an HDMI source executing process 400 is an active source. For example, process 400 can be used to determine whether audio and/or video data output by the device running process 400 is being presented by a root device, such as television 202 (e.g., whether audio and/or video data output by the device is being presented using output 204 of television 202). In a more particular example, a device executing process 400 can store a state of the device, such as whether the device is the active device, whether the device is an inactive device, or whether the current state of the device is unknown.

Figure 5:
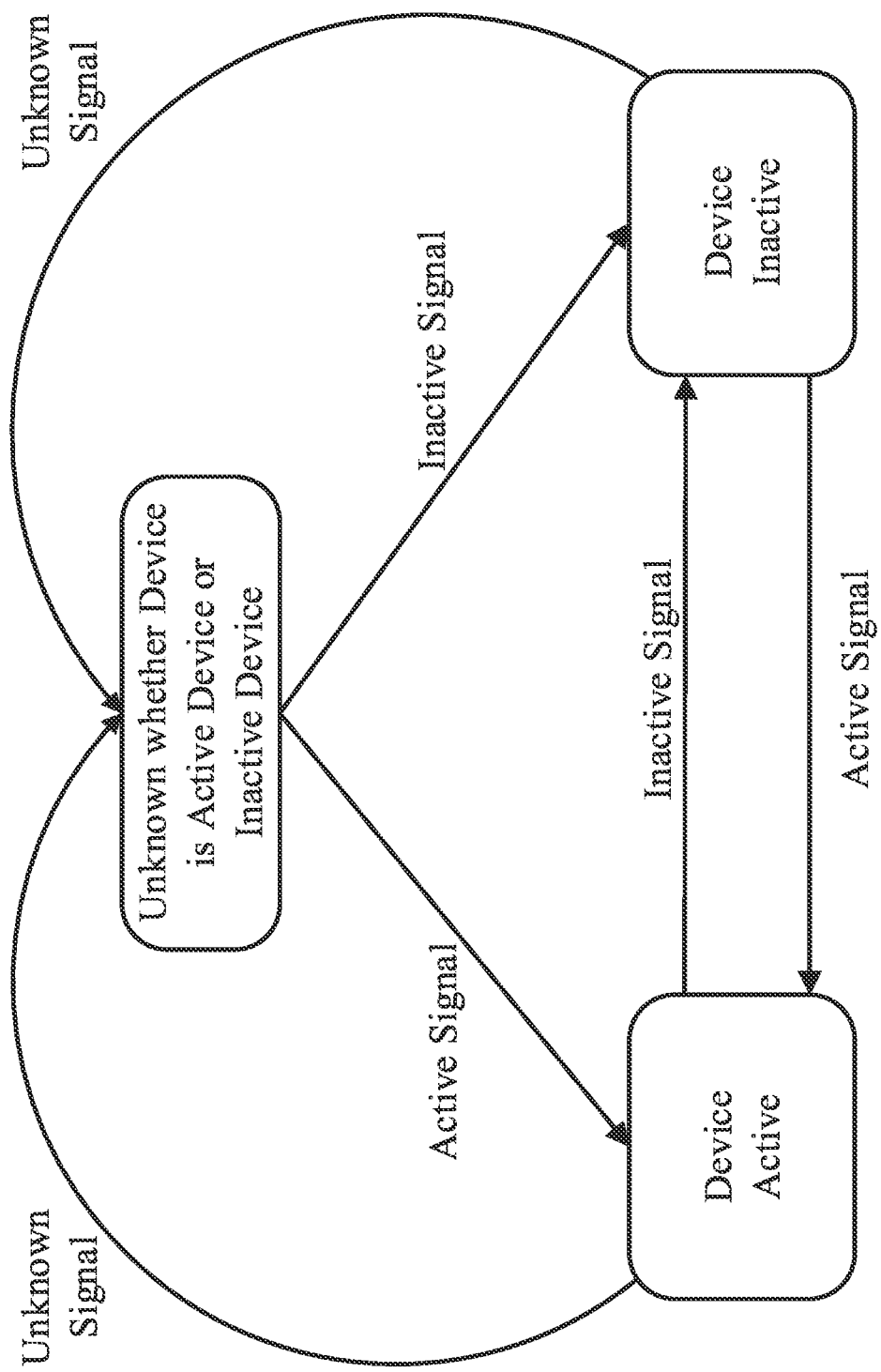
FIG. 5 shows an example of a state machine in accordance with some implementations of the disclosed subject matter.

In some implementations, a device can store a currently determined state using a state machine. For example, a state machine such as that shown in FIG. 5 can be used to store a current state of the device. As shown in the example of FIG. 5, the state of the device can be initially set to an "unknown" state. If the device determines that the device is in an "active" state or "inactive" state (e.g., by receiving an active signal or inactive signal), then the state machine can switch to the corresponding state. As illustrated in the example of FIG. 5, if the device is the active device, it can be constrained such that it can transition to the "inactive" state and/or back to the "unknown" state. Similarly, if the device is an inactive device, it can be constrained such that it can transition to the "active" state and/or transition back to the "unknown" state.

Referring back to FIG. 4A, process 400 can start, at 402, by determining whether the HDMI source running process 400 is connected to another HDMI device and/or an HDMI sink. Note that below, receiver 208 is sometimes used as an example of an HDMI source executing process 400, however any suitable HDMI device can use process 400 to manage output of the HDMI source.

At 404, process 400 can run an initialization sequence, which can be used to initially determine whether receiver 208 is the active device or an inactive device. For example, receiver 208 running process 400 can send a message to other devices on the CEC bus to determine whether another device is the active device (e.g., by sending a<Request Active Source>message).

Figure 4B:
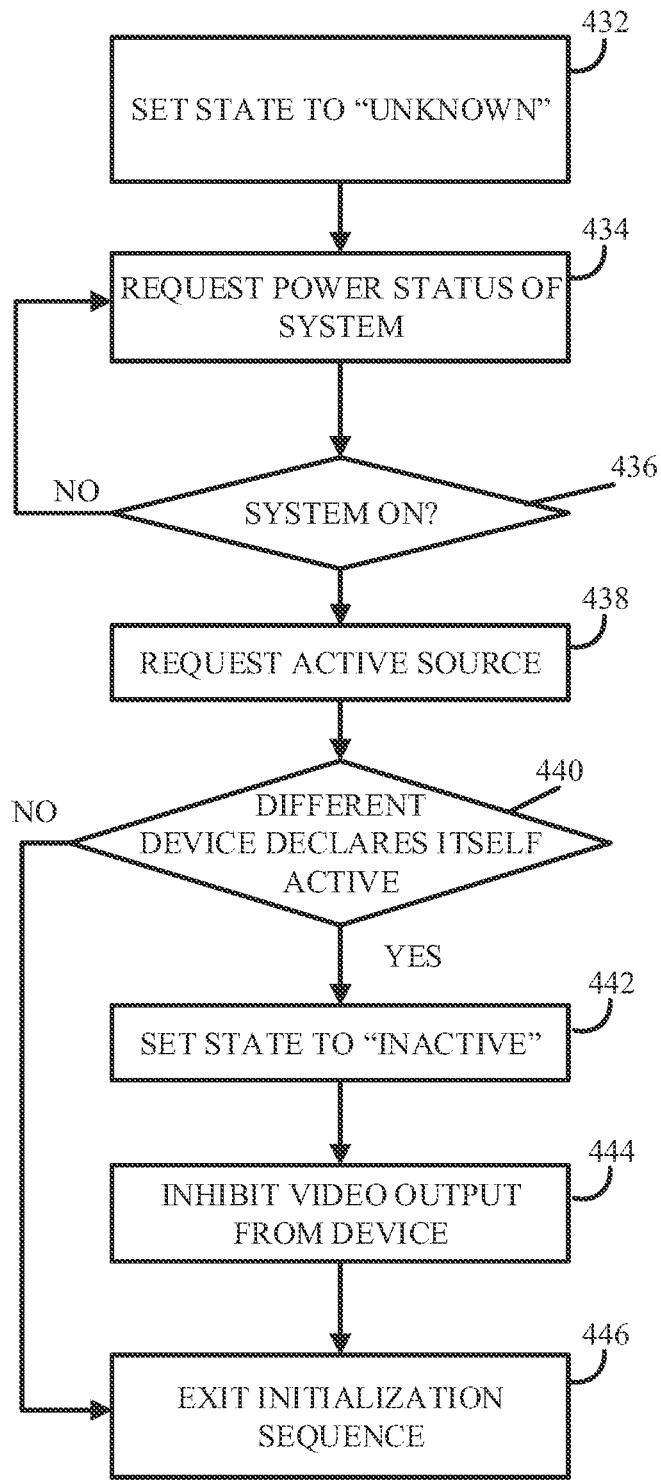
FIG. 4B shows an example of a process for performing an initialization sequence in accordance with some implementations of the disclosed subject matter.

In some implementations, the initialization sequence at 404 can include multiple actions, for example, FIG. 4B shows an example 430 of a process for performing an initialization sequence in accordance with some implementations of the disclosed subject matter. At 432, initialization sequence 430 can begin by setting a state of the HDMI device (e.g., receiver 208) executing initialization sequence 430 to an "unknown" state (e.g., neither "active" nor "inactive"). In such an unknown state, audio and/or video data may be being output from the HDMI device because it is unknown whether an output from the HDMI device (such as receiver 208) is being presented by the root device (or other HDMI sink). Alternatively, audio and/or video data can be inhibited from being output from the HDMI device because it is unknown whether an output from the HDMI device (such as received 208) is being presented by the root device (or another HDMI sink).

At 434, initialization sequence 430 can request the power status of the system (e.g., the power status of the root device, and/or another HDMI sink, such as AN Receiver 206 for presenting audio, which is connected to the HDMI device executing initialization sequence 430). For example, the HDMI device executing initialization sequence 430 can send a <Give Device Power Status >message to the root device (or other HDMI sink) requesting the power status of the device. In some implementations, the device that is the target of the <Give Device Power Status >message can respond with a<Report Power Status>message, which can indicate its current power state. Such a current power state can be "standby," "on," a transitional state between "standby" and "on," or any other suitable power state.

At 436, initialization process 430 can determine whether a response was received from the system, and whether the system indicated that it is in an "on" state. If initialization sequence 430 determines that the system did not respond that it is in an "on" state (e.g., the system reported it is in "standby," the system reported that it is in a transitional state, or no response was received from the system) ("NO" at 436), initialization sequence 430 can return to 434 and request the power status of the system again. In some implementations, a loop between 434 and 436 can be carried out at predetermined time intervals (e.g., once per second, once every two seconds, etc.) to determine if the system is in an "on" state prior to continuing with initialization sequence 430. Otherwise, if initialization sequence 430 determines that the system responded that it is in an "on" state ("YES" at 436), initialization sequence 430 can proceed to 438.

At 438, initialization sequence 430 can request the identity of an active source connected to the CEC bus. For example, initialization sequence 430 can cause a<Request Active Source>message to be sent on the CEC bus. At 440, initialization sequence 430 can determine whether an<Active Source>message is received from another HDMI device connected to the CEC bus, declaring itself to be the active source. If no<Active Source>message indicating another device to be the active source is received at 440 (e.g., after waiting a predetermined amount of time for a response, e.g., 500 milliseconds, one second, or any other suitable amount of time) ("NO" at 440), initialization sequence 430 can proceed to 446 and exit the initialization sequence with the state set as "unknown." Otherwise, if initialization sequence 430 determines that an<Active Source>message identifying a different device to be the active source is received ("YES" at 440), initialization sequence 430 can proceed to 442.

At 442, initialization sequence 430 can cause the state of the device executing initialization sequence 430 to be set to "inactive," in response to another device declaring itself the active device. Any suitable technique(s) can be used to indicate a current state of the device. For example, a signal can be maintained that corresponds to the active level of the device, such as an "active signal," wherein if the "active signal" is low, it can indicate that the device is an inactive device, and if the "active signal" is high, it can indicate that the device is an active device. In some implementations, if the "active signal" is neither high nor low (e.g., in an intermediate position, at a rail position, at ground, or any other discernible signal other than high or low), this can indicate that the state is "unknown." Additionally, the "active signal" can be implemented using any suitable technique(s), e.g., using latches, memory, switches, logic gates, etc.

At 444, initialization sequence 430 can cause output of audio and/or video data from the device to be inhibited. For example, because the state of the device is now known to be "inactive" it can be determined that any audio and/or video data output from the device is not presented to a user, and therefore output of such data is unnecessary. As another example, in some implementations, process 430 can cause the device to enter a low-power and/or standby state at 444. As yet another example, process 430 can cause services of the HDMI source that may be consuming network resources, such as bandwidth, to be paused and/or otherwise inhibited.

At 446, initialization sequence 430 can cause the device to exit the initialization sequence and begin monitoring the state of the device. For example, initialization sequence 430 can continue to 406 of process 400.

Referring back to FIG. 4A, after executing the initialization sequence at 404 (e.g., using initialization sequence 430), process 400 can proceed to 406. At 406, process 400 can check a current state of the device executing process 400 (e.g., as determined during initialization sequence 430). For example, process 400 can check the "active signal" to determine if the device is in the "active" state, "inactive" state, or "unknown" state. If the device executing process 400 is determined to be in an "active" state (e.g., based on the "active signal" being high), process 400 can proceed to 408.

At 408, process 400 can check to determine whether the device executing process 400 has transitioned to the inactive state. For example, if the current state was determined to be "active" at 406 (or "unknown" as described below), the device can be determined to be the "active" device by the state machine of FIG. 5. In such an example, the device executing process 400 can check to determine if the device has become an inactive device at 408. In some implementations, the device can be considered to be an inactive device (e.g., in an "inactive" state) if any one of multiple conditions is met. More particularly, the device can be determined to be in an "inactive" state based on a logical OR operating among a variety of conditions. In some implementations, process 400 can initiate a process, such as example 450 of a process for checking for an inactive state shown in FIG. 4C, for determining whether the device is in the "inactive" state.

Figure 4C:
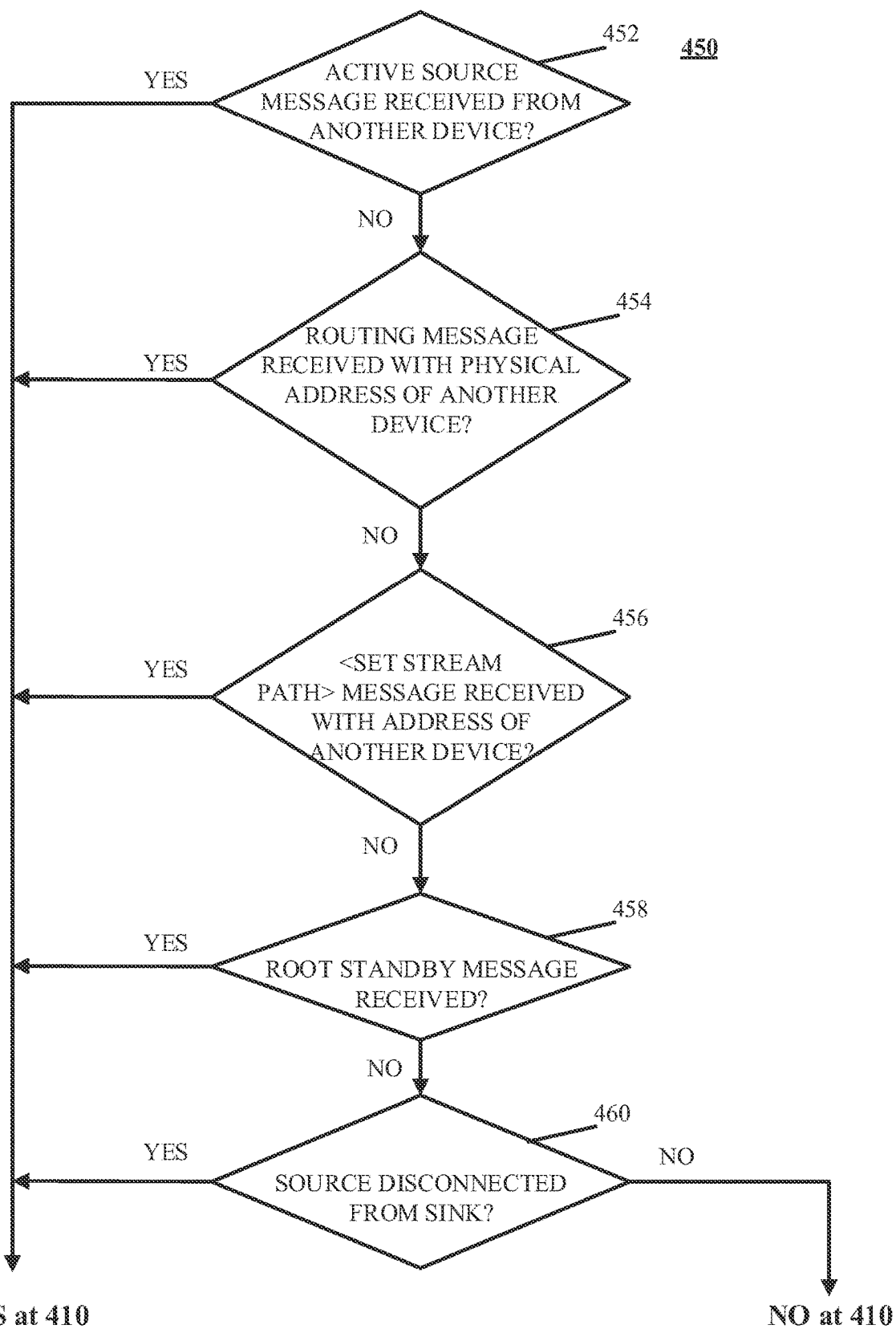
FIG. 4C shows an example of a process for checking for an inactive state in accordance with some implementations of the disclosed subject matter.

In the example shown in FIG. 4C, process 450 can make a series of checks to determine if the state of the device executing process 450 has transitioned from an "active" state to an "inactive" state (e.g., whether to change an "active signal" from high to low). Additionally, if a current state is "unknown," rather than "active," process 450 can make a series of checks to determine if the state of the device executing process 450 can be determined to be "inactive."

At 452, process 450 can determine if an<Active Source>message has been received from another device. For example, if an<Active Source>message is received with the address of another device connected to the CEC bus as an operand, this can indicate that another device is declaring itself the active device. This indicates that the device executing process 450 is an inactive device (e.g., not the active device), and any audio and/or video data output by the device is not being presented. If process 450 determines that an<Active Source>message has been received on the CEC bus indicating that another device is the active source ("YES" at 452), process 450 can output "YES" (e.g., that the device is in an "inactive" state). Otherwise, if process 450 determines that an <Active Source> has not been received on the CEC bus ("NO" at 452), process 450 can proceed to 454.

At 454, process 450 can determine if a routing message (e.g., a <Routing Change> or <Routing Information> message) has been received that includes the physical address of another device. For example, if such a message is received it can indicate that another device it to be set as the active device in response to an action of changing an input by a user. This can indicate that the device executing process 450 is an inactive device (e.g., not the active device), and any audio and/or video data output by the device is not being presented. If process 450 determines that a routing message has been received on the CEC bus that includes another device's physical address ("YES" at 454), process 450 can output "YES" (e.g., that the device is in an "inactive" state). Otherwise, if process 450 determines that a routing message has not been received on the CEC bus ("NO" at 454), process 450 can proceed to 456.

At 456, process 450 can determine if a <Set Stream Path> message has been received that includes the address of another device. For example, if such a message is received it can indicate that another device is to be set as the active device in response to a command from an FIDMI device connected to the CEC bus (e.g., by the selection of an action using television 202, such as an indication to play a recorded media item, to select a particular channel, to play media stored in a recording device or inserted into an optical media playback device, etc.). This can indicate that the device executing process 450 is an inactive device (e.g., not the active device), and any audio and/or video data output by the device is not being presented. If process 450 determines that a <Set Stream Path> message has been received on the CEC bus that includes another device's address ("YES" at 456), process 450 can output "YES" (e.g., that the device is in an "inactive" state). Otherwise, if process 450 determines that a <Set Stream Path> message indicating an address of another device has not been received on the CEC bus ("NO" at 456), process 450 can proceed to 458.

At 458, process 450 can determine if a message has been received indicating that the root device (or other HDMI sink, or any other device between a current device and an HDMI sink) has entered (or is about to enter) a "standby" mode. For example, if such a message is received, it can indicate that a device used to present audio and/or video data from the device executing process 450 has entered a standby mode and therefore may no longer further present such audio and/or video data. This can indicate that the device executing process 450 is an inactive device (e.g., not the active device), and any audio and/or video data output by the device is not being presented. If process 450 determines that a parent device (e.g., the root device, other HDMI sink, or a device between the root device and the device executing process 450) has entered (or will enter) a "standby" mode ("YES" at 458), process 450 can output "YES" (e.g., that the device is in an "inactive" state). Otherwise, if process 450 determines that a parent device has not entered a "standby" mode ("NO" at 458), process 450 can proceed to 460.

At 460, process 450 can determine if the device executing process 450 has been disconnected from the HDMI sink (e.g., from the root device or other HDMI sink that can be used to present audio and/or video data from the device executing process 450). Any suitable techniques can be used to determine if the device has been disconnected from an HDMI sink. If process 450 determines that the device has been disconnected from the HDMI sink ("YES" at 460), process 450 can output "YES" (e.g., that the device is in an "inactive" state). Otherwise, if process 450 determines that the device has not been disconnected from an HDMI sink ("NO" at 458), process 450 can output "NO" (e.g., that the device has not been determined to be in an "inactive" state).

Referring back to FIG. 4A, at 410, if process 400 determined that the device is an inactive device (e.g., based on the result of the check at 408) ("YES" at 410), process 400 can proceed to 412. For example, if process 450 indicates that the device is in an inactive state due to any of the conditions of process 450 being met, process 400 can proceed to 412.

At 412, the state of the device executing process 400 can be set as inactive in response to determining at 410 that the device is in an "inactive" state. For example, an "active signal" can be set to low in response to process 400 determining that the device is in an "inactive" state at 410.

At 414, audio and/or video data output from the device executing process 400 can be inhibited in response to the device being set in the "inactive" state at 412. For example, if the device is in the inactive state, audio and/or video data output by the device may not be presented by an HDMI sink, and therefore output of such data can be inhibited. Additionally or alternatively, process 430 can cause the device to enter a low-power and/or standby state at 414, can cause services of the device that may be consuming network resources, such as bandwidth, to be paused and/or otherwise inhibited, and/or can cause any other suitable actions to be taken.

Process 400 can proceed to 416, and it can be determined if the system is in an "on" state (e.g., as described in connection with initialization process at 434 and 436). For example, if the device is inactive because the system went to "standby," it can be checked at 416 whether the system has transitioned to an "on" state again.

Referring back to 410, if process 400 did not determine that the device is in an inactive state ("NO" at 410), process 400 can proceed to 426 to determine if the system is in the "unknown" state.

In some implementations, process 400 can determine whether the device has returned to the "unknown" state from the "active" state or the "inactive" state, or whether the device is still in the "unknown" state as determined at 406. For example, if process 400 determines that a current active source state of the system can no longer be determined, process 400 can determine that the device has transitioned from the "active" state or the "inactive" state back to the "unknown" state. In a more particular example, a <Routing Change> message can be received by a device executing process 400, such as recording device 214, specifying HDMI switch 212 that is between recording device 214 and the root device (e.g., television 202) as the source of an active input. In such a particular example, HDMI switch 212 typically broadcasts a <Routing Information> message to indicate the active path of HDMI switch 212. However, in the event that the <Routing Information> message is not sent by HDMI switch 212 or is not received by recording device 214 for any reason, process 400 may not be able to accurately determine whether the device is the active source, as any of recording device 214, non-CEC device 216 or unregistered source 218 may be the active source.

At 426, if process 400 determines that the device is in an "unknown" state ("YES" at 426), process 400 can proceed to 428. At 428, the state of the device executing process 400 can be set as unknown in response to determining at 426 that the device is in an "unknown" state. For example, an "active signal" can be set to a value that is neither high nor low (e.g., as described above in connection with 442 of FIG. 4B) in response to process 400 determining that the device is in an "unknown" state at 426. Additionally, at 426, process 400 can cause the device executing process 400 to output audio data and/or video data using the HDMI output as it is unknown whether audio data and/or video data output by the device executing process 400 is to be presented by the root device.

Otherwise, if process 400 determines that the device is not in an "unknown" state ("NO" at 426), or after the device is set as "unknown" at 428, process 400 can proceed to 416 to determine if the system is in an "on" state. If the system is in an "on" state at 416 (e.g., which can be determined: based on sending a<Give Device Power Status >message, and receiving a <Report Power Status>message that indicates the system is "on"; based on not having received a "standby" message at 410; and/or based on any other suitable criteria) ("YES" at 416), process 400 can loop back to 406 and determine a current state of the device.

At 406, if the device is in an "inactive" state (e.g., based on the "active signal" being low) ("INACTIVE" at 406), process 400 can proceed to 418. At 418, process 400 can check to determine whether the device executing process 400 has transitioned to the "active" state. For example, if the current state was determined to be "inactive" at 406 (or "unknown" as described below), the device can be determined to be an "inactive" device by the state machine of FIG. 5. For example, process 400 can determine whether the device is the "active" device by determining if: a "One-touch Play" process has been initiated; if the device's address is received in a routing message, or <Set Stream Path>message; the system has come out of "standby" and the device was the "active" device when the device went to "standby"; etc. In some implementations, the device can be considered to be the active device (e.g., in an "active" state) if any one of multiple conditions is met. More particularly, the device can be determined to be in the "active" state based on a logical OR operating among a variety of conditions. In some implementations, process 400 can initiate a process, such as example 470 of a process for checking for an "active" state shown in FIG. 4D, for determining whether the device is in the "active" state.

Figure 4D:
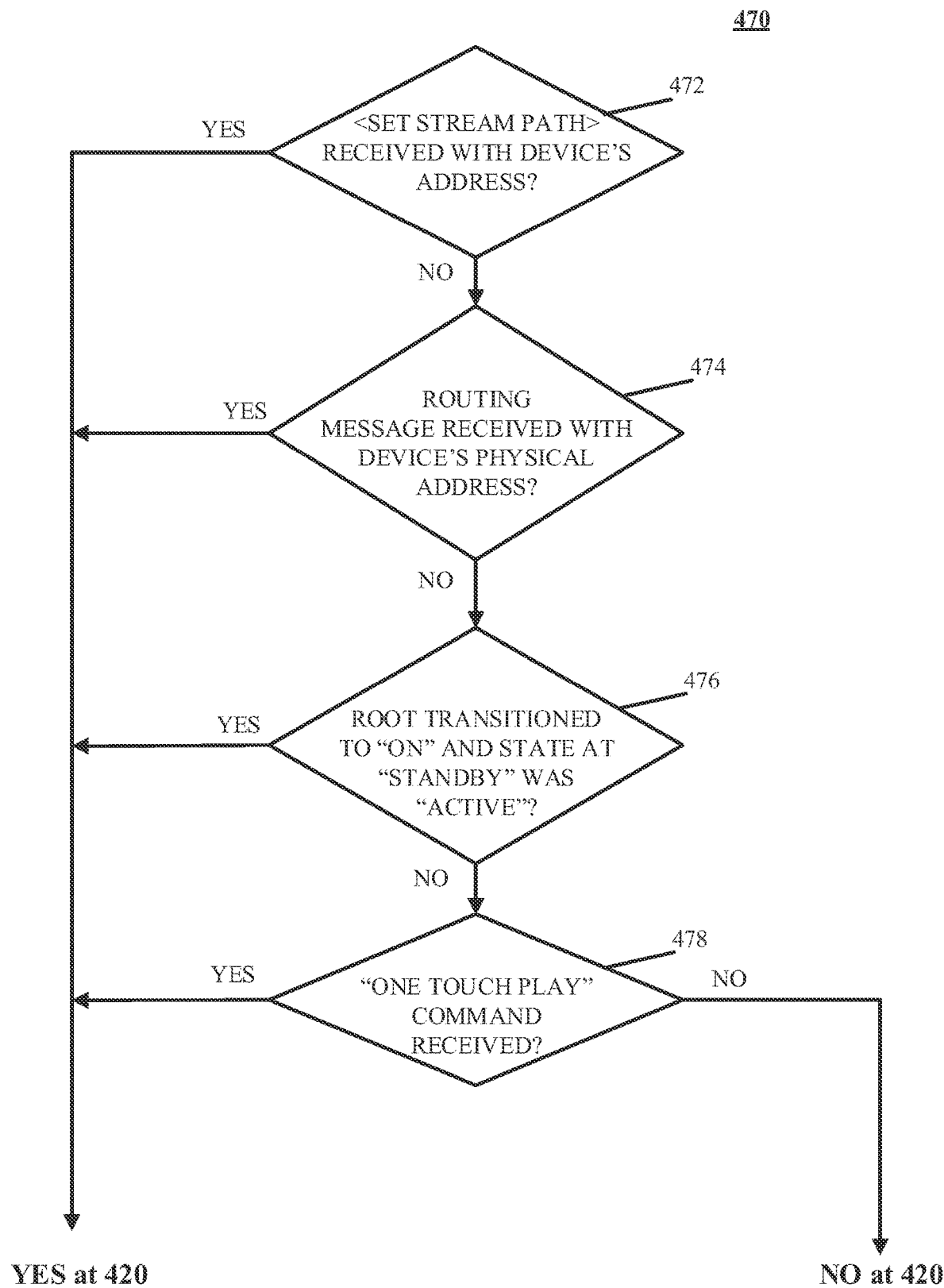
FIG. 4D shows an example of a process for checking for an active state in accordance with some implementations of the disclosed subject matter.

In the example shown in FIG. 4D, process 470 can make a series of checks to determine if the state of the device executing process 450 has transitioned from an "inactive" state to an "active" state (e.g., whether to change an "active signal" from low to high). Additionally, if a current state is "unknown," rather than "inactive," process 450 can make a series of checks to determine if the state of the device executing process 450 can be determined to be "active."

At 472, process 470 can determine if a<Set Stream Path>message has been received that includes the address of the device executing process 470. For example, if such a message has been received, it can indicate that the device is to be set as the active device in response to a command from an HDMI device connected to the CEC bus (e.g., by the selection of an action using television 202, such as an indication to play a recorded media item from the device, to tune to a particular channel using the device, to play media stored in the device, etc.). This can indicate that the device executing process 470 is to be the "active" device, and any audio and/or video data output by the device is being presented. If process 470 determines that a <Set Stream Path>message has been received on the CEC bus that includes the device's address ("YES" at 472), process 470 can output "YES" (e.g., that the device is in an "active" state). Otherwise, if process 470 determines that a<Set Stream Path>message including the device's address has not been received on the CEC bus ("NO" at 472), process 470 can proceed to 474.

At 474, process 470 can determine if a routing message (e.g., a<Routing Change> or <Routing Information>message) has been received that includes the physical address of the device executing process 470. For example, if such a message has been received, it can indicate that the device is to be set as the active device in response to an action of changing an input by a user. This can indicate that the device executing process 470 is to be the active device, and any audio and/or video data output by the device is being presented. If process 470 determines that a routing message has been received on the CEC bus that includes the device's physical address ("YES" at 474), process 470 can output "YES" (e.g., that the device is in an "active" state). Otherwise, if process 470 determines that a routing message that includes the device's physical address has not been received on the CEC bus ("NO" at 474), process 470 can proceed to 476.

At 476, process 470 can determine if the root device (or other HDMI sink) has transitioned to an "on" state from a "standby" state (e.g., as determined at 416 of process 400) and that the device executing process 470 was in an "active" state when the root device (or other HDMI sink) last transitioned to the "standby" state. This can indicate that the device executing process 470 is the active device, and any audio and/or video data output by the device is being presented. If process 470 determines that the root device (or other HDMI sink) has transitioned to "on" and the device was the "active" device when the root device (or other HDMI sink) went to "standby mode" ("YES" at 476), process 470 can output "YES" (e.g., that the device is in an "active" state). Otherwise, if process 470 determines that the root device has not transitioned to an "on" state, or that the device executing process 470 was not active when the root device transitioned to "standby" ("NO" at 458), process 470 can proceed to 478.

At 478, process 470 can determine if a "One Touch Play" command has been received. For example, a device executing process 470 can include a "One Touch Play" feature that causes the device to commence playing a media item on an HDMI sink. More particularly, upon receiving a "One Touch Play" command, the device executing process 470 can send an <Active Source>message on the CEC bus that includes the physical address of the device. As described above, such an<Active Source>message can indicate that the device is declaring itself to be the active source. Additionally, the device can cause the HDMI sink to begin presenting audio and/or video data that was caused to be played in response to receiving the "One Touch Play" command. If process 470 determines that a "One Touch Play" Command has been received ("YES" at 478), process 470 can output "YES" (e.g., that the device is in an "active" state). Otherwise, if process 470 determines that a "One Touch Play" Command has not been received ("NO" at 478), process 470 can output "NO" (e.g., that the device has not been determined to be in an "inactive" state).

Referring back to FIG. 4A, at 420, if process 400 determined that the device is in an "active" state ("YES" at 420), process 400 can proceed to 422. For example, if process 470 indicates that the device is in an "active" state due to any of the conditions of process 470 being met, process 400 can proceed to 422.

At 422, the state of the device executing process 400 can be set as "active" in response to determining at 420 that the device is in an "active" state. For example, an "active signal" can be set to high in response to process 400 determining that the device is in an "active" state at 420.

At 424, audio and/or video data can be output from the device executing process 400 in response to the device being set in the "active" state at 422. For example, if the device is in the active state, audio and/or video data output by the device may be presented by an HDMI sink, and therefore output of such data can be carried out, and process 400 can loop back to 406.

Referring back to 420, if process 400 did not determine that the device is in an "active" state ("NO" at 420), process 400 can proceed to 426 to determine if the system is in an "unknown" state, as described above.

In some implementations, in cases where a current active state of the device executing process 400 is "unknown" (e.g., the state was not determined during the initialization sequence at 404 and/or the device was determined to be in an "unknown" state at 426) process 400 can proceed to both 408 and 418 from 406, and can loop back to 406 until a new state of the device is determined (e.g., "YES" at either 410 or 420).

In some implementations, the mechanisms described herein can be used to determine, when an HDMI source is connected to an HDMI sink, whether the HDMI source is an active source. For example, referring to the devices of FIG. 2, when receiver 208 is connected to television 202 via A/V receiver 206, receiver 208 can execute the initialization sequence described in connection with FIG. 4B, and can initially set the state of receiver 208 as "unknown." Upon executing the initialization sequence of FIG. 4B (e.g., initialization sequence 430), receiver 208 may receive an<Active Source>message identifying set-top box 210 as the active source (e.g., the <Active Source>message can include physical address 2.0.0.0). In response to receiving such an<Active Source>message, receiver 208 can transition to the "inactive" state, which can indicate that receiver 208 is not currently the active source being presented using output 204 of television 202.

As another example, if receiver 208 is currently in an "active" state, and receiver 208 receives a message on the CEC bus indicating that television 202 is going to a "standby" mode, receiver 208 can transition to an "inactive" state (e.g., based on a determination at 410 that the state is now "inactive"). As yet another example, if receiver 208 is in an "inactive" state and an "on" state of television 202 is determined to transition to transition from a "standby" state to an "on" state (e.g., as determined at 416 of FIG. 4A), receiver 208 can check whether it was the active source when television 202 transitioned from an "on" state to a "standby" state. If receiver 208 was in an "active" state when television 202 transitioned to "standby", then receiver 208 can transition to an "active" state when television 202 is determined to have transitioned to "on."

As still another example, when receiver 208 is connected to television 202 via A/V receiver 206, receiver 208 can execute the initialization sequence described in connection with FIG. 4B, and can initially set the state of receiver 208 as "unknown." Upon executing the initialization sequence of FIG. 4B (e.g., initialization sequence 430), receiver 208 may not receive an<Active Source>message (e.g., if the currently active source is a non-CEC enabled HDMI device such as non-CEC device 216). In response to not receiving such an<Active Source>message, receiver 208 can maintain the "unknown" state, and can monitor signals on the CEC bus (e.g., routing messages, <Active Source>messages, etc.) to determine whether the state of the device is an active or inactive state.

The mechanisms described herein can be used in various applications. For example, these mechanisms can be used to determine user engagement with a particular HDMI source by monitoring a proportion of the time that the device is in user while a connected HDMI sink is in an "on" state. As another example, these mechanisms can be used to provide an enhanced user experience by, e.g., pausing playback of content when the HDMI source utilizing the mechanisms is no longer the active source and resuming playback (or presenting the portion of content at which playback was paused) upon the device becoming the active device again. As yet another example, these mechanisms can be used to inhibit output of audio and/or video data to an HDMI sink when the HDMI source is determined to be an inactive source, which can thereby reduce resource use by not outputting audio and/or video data when such data is not being presented.

Figure 6:
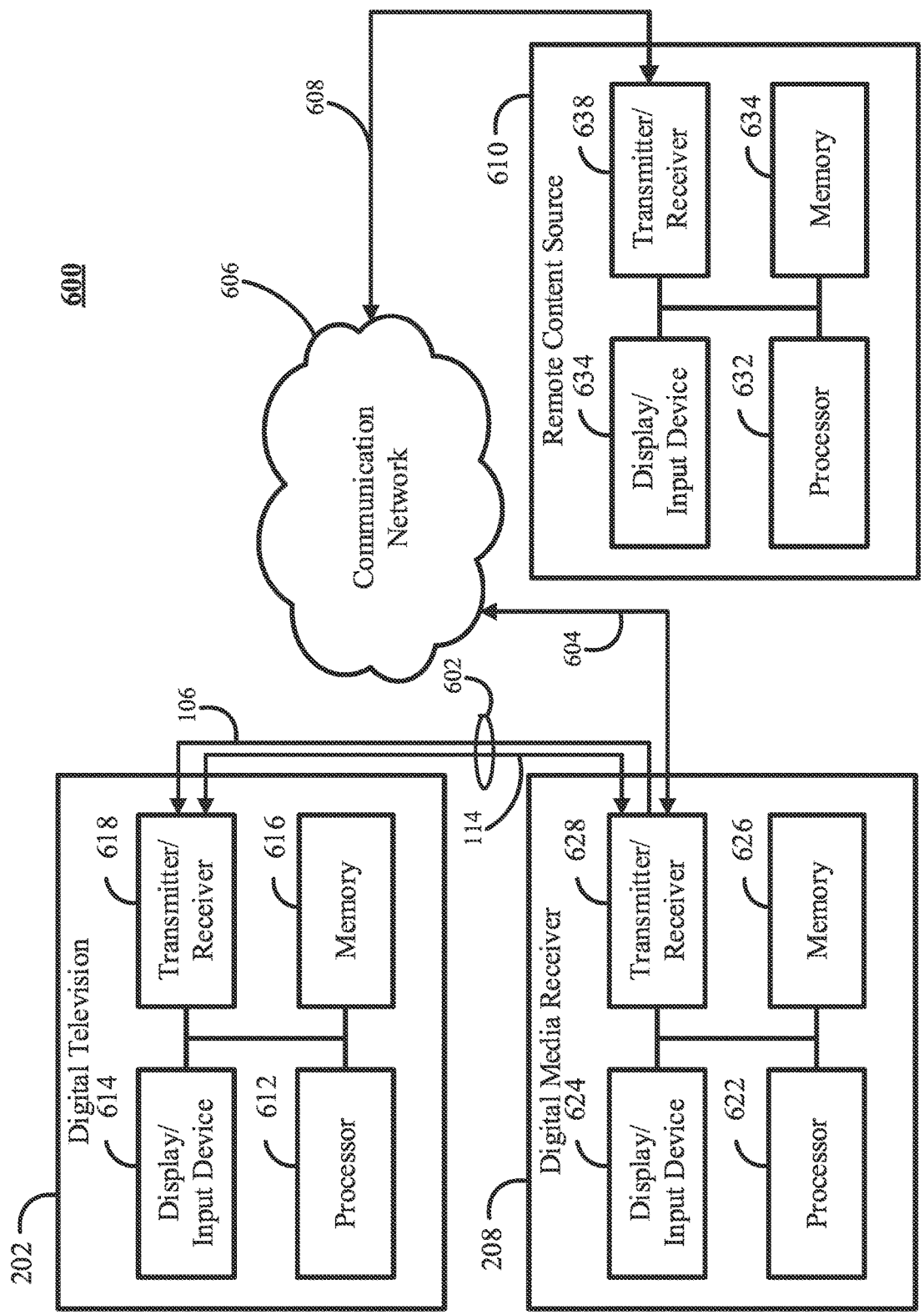
FIG. 6 shows an example of a schematic diagram of hardware in accordance with some implementations of the disclosed subject matter.

FIG. 6 shows an example 600 of a schematic diagram of hardware that can be used to implement digital television 202 and digital media receiver 208 depicted in FIG. 2, and a remote content source 610, in accordance with some implementations of the disclosed subject matter. As illustrated, system 600 can include digital television 202 and a digital media receiver 208. Note digital media receiver 208 is merely shown as an example of a device that can be utilize the mechanisms described here, and it is understood that any other suitable device can be connected to the CEC bus and can use the mechanisms described herein for managing output.

Digital media receiver 208 can be connected by an HDMI connection 602 to digital television 202. Note that the two lines 106 and 114 are shown between digital media receiver 208 and digital television 202 as part of HDMI connection 602, where line 106 (e.g., TMDS channels) is unidirectional indicating that audio and/or video flows only from digital media receiver 208 to digital television 202, while line 114 (e.g., the CEC line) is bi-directional indicating that ancillary signals (e.g., CEC messages on the CEC line/bus) can flow in both directions. HDMI connection 602 can be any suitable HDMI connection, which can include HDMI switches, or any other suitable hardware or software for causing audio and/or video data output by digital media receiver 208 to be sent to digital television 202.

In some implementations, digital media receiver 208 can also be connected by a communication link 604 to a communications network 606 that can be linked via a communications link 608 to remote content source 610.

In some implementations, digital television 202, digital media receiver 208, and remote content source 610 can be any of a general purpose device such as a computer or a special purpose device such as a client, a server, a television, etc. Any of these general or special purpose devices can include any suitable components such as a hardware processor (which can be a microprocessor, digital signal processor, a controller, etc.), memory, communication interfaces, display controllers, input devices, etc. For example, digital media receiver 208 can be implemented as a computer for receiving media content from a remote source and outputting such media content to a presentation device such as a television, a smartphone, a tablet computer, a wearable computer, a personal computer, a laptop computer, a gaming console, a set-top box, a smart television, a server, etc.

Communications network 606 can be any suitable computer network or combination of such networks including the Internet, an intranet, a wide-area network (WAN), a local-area network (LAN), a wireless network, a digital subscriber line (DSL) network, a frame relay network, an asynchronous transfer mode (ATM) network, a virtual private network (VPN), etc. Communications links 604 and 608 can be any communications links suitable for communicating data among digital media receiver 208 and remote content source 610 such as network links, dial-up links, wireless links, hard-wired links, any other suitable communications links, or any suitable combination of such links.

System 600 can include one or more remote content sources 610. Remote content source 610 can be any suitable software and/or hardware for providing access to media content items, such as a processor, a computer, a data processing device, and/or any suitable combination of such devices. For example, remote content source 610 can include a content discovery server for discovering content to be presented using digital media receiver 208 and/or a content delivery server for delivering content to digital media receiver 208.

In some implementations, digital television can include a hardware processor 612, a display/input device 614, memory 616, and a transmitter/receiver 618, which can be interconnected. In some implementations, memory 616 can include a storage device (such as a non-transitory computer-readable medium) for storing a computer program for controlling hardware processor 612.

Hardware processor 612 can use the computer program to present on display/input device 614 audio and/or video data received from digital media receiver 208 and/or an interface that allows a user to, among other things, cause media content to be presented on display/input device 614 from digital media receiver 208 or any other suitable device, including from an internal tuner of digital television 202. It should also be noted that data received through HDMI connection 602 or any other communications links can be received from any suitable source. In some implementations, hardware processor 612 can send and receive data through HDMI connection 602 or any other communication links using, for example, a transmitter, receiver, transmitter/receiver, transceiver, or any other suitable communication device, such as transmitter/receiver 618. Display/input device 614 can include a touchscreen, a flat panel display, a cathode ray tube display, a projector, a speaker(s), and/or any other suitable display and/or presentation devices, and/or can include a remote control, a computer keyboard, a computer mouse, a microphone, a touchpad, a voice recognition circuit, a touch interface of a touchscreen, and/or any other suitable input device. Transmitter/receiver 618 can include any suitable transmitter and/or receiver for transmitting and/or receiving, among other things, media content including audio and/or video content, which can include HDMI inputs (e.g., for receiving audio and/or video, receiving and/or sending CEC messages, etc.), an internal tuner, other analog or digital audio and/or video inputs/outputs (e.g., coaxial cable inputs and/or outputs, RCA inputs and/or outputs, component video inputs/outputs, any other suitable analog and/or digital outputs, or any suitable combination thereof), data inputs and/or outputs (e.g., Ethernet, Wi-Fi, cellular data, etc.), or any suitable combination thereof.

Digital media receiver 208 can include a hardware processor 622, a display/input device 624, memory 626, and a transmitter/receiver 628, which can be interconnected. In some implementations, memory 626 can include a storage device (such as a non-transitory computer-readable medium) for storing a computer program for controlling hardware processor 622.

Hardware processor 622 can use the computer program to provide audio and/or video data (e.g., receiver from remote content source 610) to transmitter/receiver 628 to be sent to digital television 202 over HDMI connection 602. It should also be noted that data received through communications link 604 or any other communications links can be received from any suitable source. In some implementations, hardware processor 622 can send and receive data through HDMI connection 602, communications link 604 or any other communication links using, for example, a transmitter, receiver, transmitter/receiver, transceiver, or any other suitable communication device, such as transmitter/receiver 628. Display/input device 624 can include a remote control, a computer keyboard, a computer mouse, a microphone, a touchpad, a voice recognition circuit, a touch interface of a touchscreen, and/or any other suitable input device, and can further include a touchscreen, a flat panel display, a cathode ray tube display, a projector, a speaker or speakers, and/or any other suitable display and/or presentation devices. Transmitter/receiver 628 can include any suitable transmitter and/or receiver for transmitting and/or receiving, among other things, media content including audio and/or video content, which can include HDMI inputs and/or outputs (e.g., for sending and/or receiving audio and/or video, sending and/or receiving CEC messages, etc.), an internal tuner, any other analog or digital audio and/or video inputs/outputs (e.g., coaxial cable inputs and/or outputs, RCA inputs and/or outputs, component video inputs/outputs, any other suitable analog and/or digital outputs, or any suitable combination thereof), data inputs and/or outputs (e.g., Ethernet, Wi-Fi, cellular data, etc., for receiving audio, video, or any other data over, for example, communication link 604), or any suitable combination thereof.

Remote content source 610 can include a hardware processor 632, a display/input device 634, memory 636, and a transmitter/receiver 628, which can be interconnected. In some implementations, memory 636 can include a storage device for storing data received through communications link 608 or through other links. The storage device (such as a non-transitory computer-readable medium) can further include a server program for controlling hardware processor 632.

Hardware processor 632 can use the server program to communicate with digital media receiver 208, as well as provide access to media content. It should also be noted that data received through communications link 608 or any other communications links can be received from any suitable source. In some implementations, hardware processor 632 can send and receive data through communications link 608 or any other communication links using, for example, a transmitter, receiver, transmitter/receiver, transceiver, or any other suitable communication device, such as transmitter/receiver 638. In some implementations, hardware processor 632 can receive commands and/or values transmitted by one or more devices, such as digital media receiver 208. Display/input device 634 can include a touchscreen, a flat panel display, a cathode ray tube display, a projector, a speaker(s), and/or any other suitable display and/or presentation devices, and can further include a computer keyboard, a computer mouse, a microphone, a touchpad, a voice recognition circuit, a touch interface of a touchscreen, and/or any other suitable input device. Transmitter/receiver 618 can include any suitable transmitter and/or receiver for transmitting and/or receiving, among other things, media content including audio and/or video content.

In some implementations, any suitable computer readable media can be used for storing instructions for performing the functions and/or processes described herein. For example, in some implementations, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

It should be understood that the above described steps of the processes of FIGS. 4A-D can be executed or performed in any order or sequence not limited to the order and sequence shown and described in the figures. Also, some of the above steps of the processes of FIGS. 4A-D can be executed or performed substantially simultaneously where appropriate or in parallel to reduce latency and processing times.

It should also be noted that, as used herein, the term mechanism can encompass hardware, software, firmware, or any suitable combination thereof.

Accordingly, methods, systems, and media for managing output of an HDMI source are provided.

Although the invention has been described and illustrated in the foregoing illustrative implementations, it is understood that the present disclosure has been made only by way of example, and that numerous changes in the details of implementation of the invention can be made without departing from the spirit and scope of the invention, which is limited only by the claims that follow. Features of the disclosed implementations can be combined and rearranged in various ways.

What is claimed is:

1. A method for controlling output of HDMI sources, the method comprising:
   determining that a message of a plurality of messages from one or more HDMI sources over a consumer electronic control bus indicates a status of an HDMI source, wherein the message identifies a second address as a physical address of a device to be set as an active source; and
   setting a state associated with the HDMI source based on the message.

2. The method of claim 1, further comprising determining whether to output media content from the HDMI source based on the state associated with the HDMI source.

3. The method of claim 2, wherein the message indicates that the HDMI source is an inactive source and wherein the method further comprises preventing the output of the media content from the HDMI source to an HDMI sink.

4. The method of claim 3, wherein the HDMI source is associated with a first address of the consumer electronic control bus and wherein a second message over the consumer electronic control bus indicates that the second address on the consumer electronic control bus different from the first address is the active source.

5. The method of claim 1, wherein the message indicates that the HDMI source is the active source and wherein the method further comprises outputting media content from the HDMI source to an HDMI sink.

6. A method for controlling output of HDMI sources, the method comprising:
   determining that a message of a plurality of messages from one or more HDMI sources over a consumer electronic control bus indicates a status of an HDMI source, wherein the message is a routing control message that identifies a second address as a device to be set as an active source; and
   setting a state associated with the HDMI source based on the message.

7. The method of claim 1, wherein the message indicates that the HDMI source is an inactive source and wherein the method further comprises preventing receipt of media content by the HDMI source from a remote content source based on the status being set as the inactive source.

8. The method of claim 1, further comprising determining timing information that the HDMI source is used as the active source relative to other sources connected to the consumer electronic control bus based the status of the HDMI source.

9. The method of claim 1, further comprising:
   determining that HDMI sink is in a standby state;
   (a) sending a request for a power status of the HDMI sink in response to determining that the HDMI sink is in the standby state;
   (b) receiving a power status of the HDMI sink;
   (c) determining the power status of the HDMI sink from the power status;
   (d) repeating (a)-(c) in response to determining that the HDMI sink is in the standby state;
   (e) determining an active status of the HDMI source upon determining that the HDMI sink is in an on state at (c); and
   (f) setting the status of the HDMI source based on the determination at (e).

10. The method of claim 9, wherein:
    determining an active status comprises determining that the HDMI source was an active device at a time at which it is determined that the HDMI sink is in the standby state;
    setting the status of the HDMI source at (f) comprises setting the status of the HDMI source to active; and
    the method further comprises causing media content to be output by the HDMI source in response to the status being set to active.

11. The method of claim 1, wherein the message indicates that a first address on the consumer electronic control bus associated with a first HDMI source is the active source and wherein the method further comprises inhibiting, based on the message, output of video from a second HDMI source associated with the second address on the consumer electronic control bus that is different from the first address.

12. The method of claim 11, wherein the output of video is to an HDMI sink.

13. The method of claim 11, wherein the message is a routing control message that identifies the first address as a device to be set as the active source.

14. The method of claim 11, wherein the message that indicates that the first address is associated with the first HDMI source that is the active source is transmitted in response to a user input to activate a device associated with the first HDMI source.

15. The method of claim 14, wherein the user input is a "One Touch Play" command received from a remote associated with the device.

16. The method of claim 11, further comprising causing a device associated with the second HDMI source to enter a standby state.

17. A system for controlling output of HDMI sources, the system comprising:
    a hardware processor that:

determines that a message of a plurality of messages from one or more HDMI sources over a consumer electronic control bus indicates a status of an HDMI source, wherein the message identifies a second address as a physical address of a device to be set as an active source; and sets a state associated with the HDMI source based on the message.

18. A non-transitory computer-readable medium containing computer executable instructions that, when executed by a processor, cause the processor to perform a method for controlling output of HDMI sources, the method comprising:

determining that a message of a plurality of messages from one or more HDMI sources over a consumer electronic control bus indicates a status of an HDMI source, wherein the message identifies a second address as a physical address of a device to be set as an active source; and setting a state associated with the HDMI source based on the message.

19. A system for controlling output of HDMI sources, the system comprising:

a hardware processor that:

determines that a message of a plurality of messages from one or more HDMI sources over a consumer electronic control bus indicates a status of an HDMI source, wherein the message is a routing control message that identifies a second address as a device to be set as an active source; and sets a state associated with the HDMI source based on the message.

20. A non-transitory computer-readable medium containing computer executable instructions that, when executed by a processor, cause the processor to perform a method for controlling output of HDMI sources, the method comprising:

determining that a message of a plurality of messages from one or more HDMI sources over a consumer electronic control bus indicates a status of an HDMI source, wherein the message is a routing control message that identifies a second address as a device to be set as an active source; and setting a state associated with the HDMI source based on the message.

\* \* \* \* \*